US007200699B2

(12) United States Patent
Bose et al.

(10) Patent No.: US 7,200,699 B2
(45) Date of Patent: Apr. 3, 2007

(54) SCALABLE, TWO-STAGE ROUND ROBIN ARBITER WITH RE-CIRCULATION AND BOUNDED LATENCY

(75) Inventors: Bijoy Bose, San Jose, CA (US); Sridhar Lakshmanamurthy, Sunnyvale, CA (US); Mark B. Rosenbluth, Uxbridge, MA (US); Irwin Vaz, San Jose, CA (US); Alok Mathur, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/933,621

(22) Filed: Sep. 2, 2004

(65) Prior Publication Data

US 2006/0047873 A1   Mar. 2, 2006

(51) Int. Cl.
    *G06F 13/368* (2006.01)
(52) U.S. Cl. ..................... 710/120; 710/317
(58) Field of Classification Search ............. 710/111, 710/112, 243
    See application file for complete search history.

(56) References Cited

U.S. PATENT DOCUMENTS

| 4,924,380 | A | * | 5/1990 | McKinney et al. ......... 710/111 |
| 5,519,837 | A | * | 5/1996 | Tran ........................... 710/111 |
| 5,740,171 | A | * | 4/1998 | Mazzola et al. ............ 370/392 |
| 5,764,636 | A | * | 6/1998 | Edsall ......................... 370/401 |
| 5,832,278 | A | * | 11/1998 | Pham ......................... 710/243 |
| 6,427,196 | B1 | * | 7/2002 | Adiletta et al. ............. 711/158 |
| 2002/0065938 | A1 | * | 5/2002 | Jungck et al. .............. 709/246 |

OTHER PUBLICATIONS

Peterson et al., "Operating System Concepts", 1985, Addison Westley, 2nd Ed., pp. 120-129.*

* cited by examiner

*Primary Examiner*—Khanh Dang
(74) *Attorney, Agent, or Firm*—Blakely, Sokoloff, Taylor & Zafman LLP

(57) ABSTRACT

A scalable, two-stage round-robin arbiter with re-circulation and bounded latency for use in multi-threaded, multi-processing devices. An apparatus implementing the two-stage arbiter includes a plurality of masters configured in a plurality of clusters, a plurality of targets, and an chassis interconnect that may be controlled to selectively connects a given master to a given target. The chassis interconnect includes multiple sets of bus lines connected between the plurality of clusters and the plurality of targets forming a cross-bar interconnect, including sets of bus lines corresponding to a command bus. A two-stage arbitration scheme is employed to arbitrate access to the command bus. The first arbitration stage is used to arbitrate between command requests issued by masters in a given cluster. The second arbitration stage is used to arbitrate between winning first stage command requests. One embodiment of the arbitration scheme employs re-circulation of second stage losers. Another embodiment employs re-prioritization of second stage losers.

30 Claims, 8 Drawing Sheets

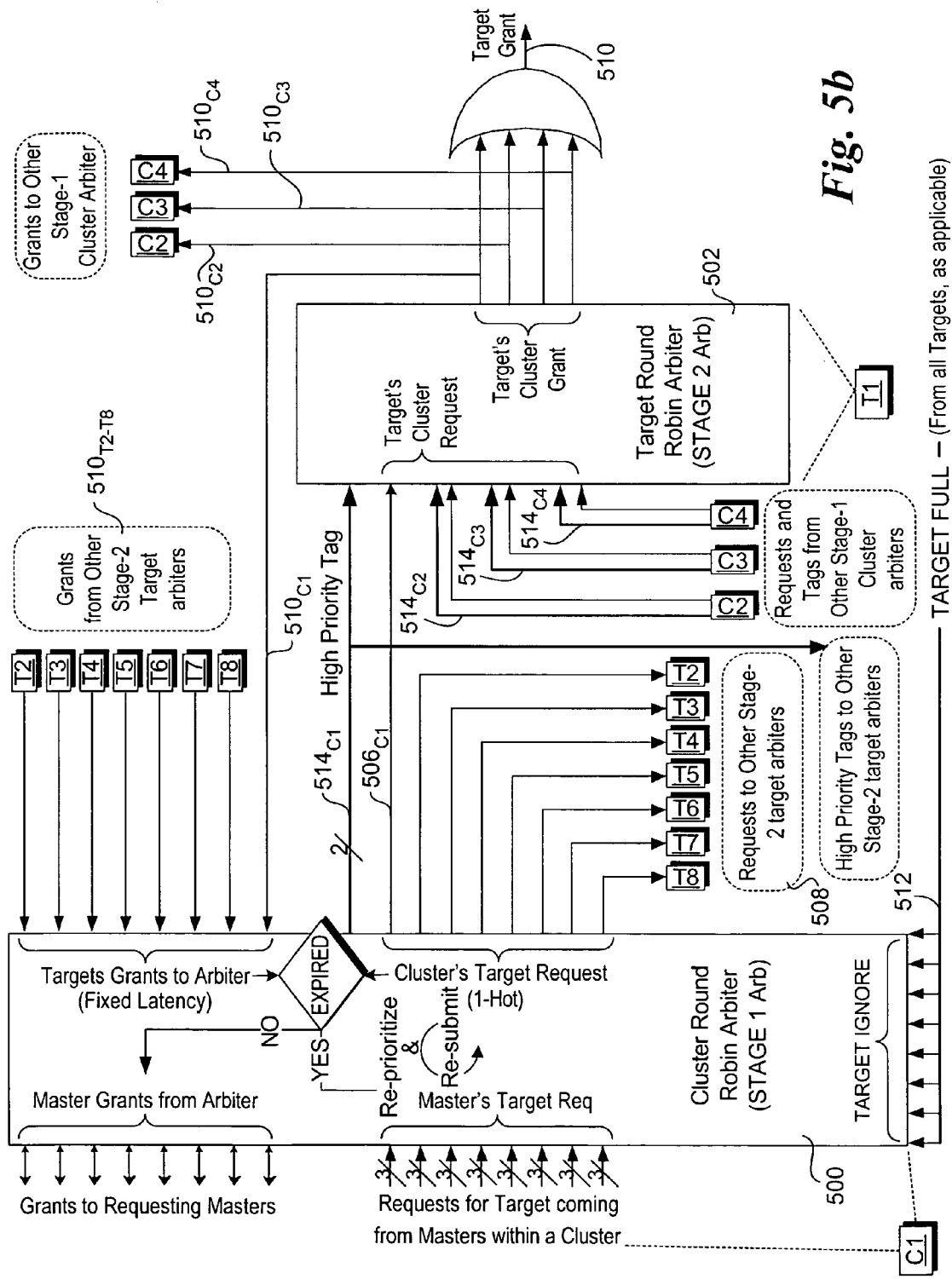

SCALABLE, TWO-STAGE ROUND ROBIN ARBITER WITH RE-CIRCULATION AND BOUNDED LATENCY

FIELD OF THE INVENTION

The field of invention relates generally to network equipment and, more specifically but not exclusively relates a scalable, two-stage re-circulating round robin arbiter with bounded latency for use in multi-threaded, multi-processing system-on-a-chip devices, such as a network processor unit.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are collectively referred to as "packet processing."

Modern network processors perform packet processing using multiple multi-threaded processing elements (referred to as microengines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various packet-processing elements (e.g., microengines) of a network processor, as well as other optional processing elements, such as general-purpose processors, will share access to various system resources. Such shared resources typically include data storage and processing units, such as memory stores (e.g., SRAM, DRAM), hash units, cryptography units, etc., and input/output (I/O) interfaces. The shared resources and their consumers are interconnected via sets of buses known as the "chassis." The chassis is a high-performance interconnect on the network processor chip that provides the on-chip data transport infrastructure between numerous processing elements on the chip and the numerous shared resources on-chip or accessible via appropriate built-in chip interfaces.

Under typical network processor configurations, various bus schemes are employed to enable shared access to the shared resources. Since only a single set of signals can be present on a given bus at any point in time, buses require multiplexing and the like to allow multiple resource consumers to access multiple resource targets coupled to the bus. In order to support concurrent access to shared resources, the network processor must arbitrate grants to its buses. There are several types of arbitration situations. Under one situation, one or more data transaction requesters (e.g., microengine threads) may request access to a particular resource accessed via a dedicated bus. Under another situation, multiple requesters request access to different shared resources coupled to a common bus. This latter situation may prove particularly difficult to perform bus management in an efficient manner.

One technique for relieving access contention is to provide separate buses for data reads and data writes for each shared resource. However, implementing separate buses for reads and writes for each target increases the bus count, and thus adds to the already crowded signal routing requirements for the network processor chip. Consider, under a conventional approach, sharing access to 16 shared resources requires 16 independent sets of buses, with each set of buses including a read bus, a write bus, and a command bus for a total of 48 buses. To support routing for such a large number of buses, dies sizes must be increased; this directly conflicts with the goal of reducing dies sizes and processor costs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5b is a schematic diagram illustrating details of a two-stage arbitration scheme employing re-prioritization of second stage arbitration losers, according to one embodiment of the invention.

DETAILED DESCRIPTION

Embodiments of a scalable, two-stage round robin arbiter with recirculation and bounded latency for use in multi-threaded, multi-processing devices are described herein. In the following description, numerous specific details are set forth, such as exemplary implementations designed for network processors, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect of the embodiments described herein, a scalable chassis infrastructure based on principles of a cross-bar architecture is implemented to enable access to a large number of shared resources without requiring individual bus sets for each shared resource. The chassis supports transactions between two types of agents: masters and targets. In one embodiment, the masters are organized into groups ("clusters") that share common bus infrastructure. The chassis also comprises a set of high performance buses, including command buses that move commands from masters to targets, and respective sets of push and pull data and request identifier (ID) buses.

Figure 1:
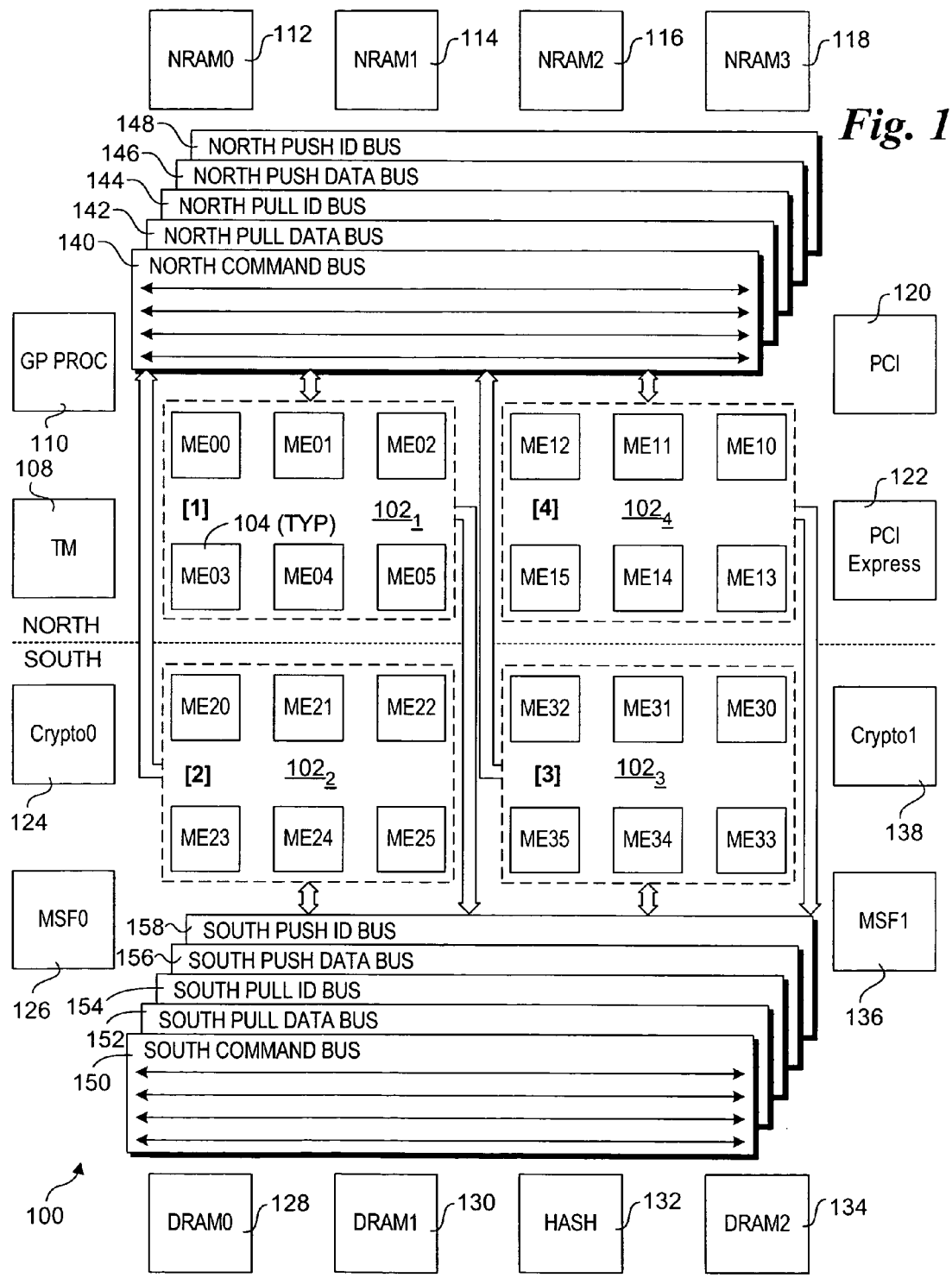
FIG. 1 is a schematic diagram of a network processor architecture in which multiple clusters, each including multiple masters, are connected to multiple shared resources (targets) via a chassis interconnect including north and south command buses having crossbar configurations, according to one embodiment of the invention.

FIG. 1 shows a network processor architecture 100 that implements one embodiment of the aforementioned chassis interconnect. At the heart of the architecture are four processing element clusters $102_1$, $102_2$, $102_3$, and $102_4$. (For convenience, the clusters are also labeled [1], [2], [3], and [4] in the figures herein, so as to more easily identify relationship between the clusters and various bus components having a reference number that includes a suffix or subscript having a value of one of 1, 2, 3, or 4.) In the illustrated embodiment, each of processing element clusters $102_{1-4}$ includes six packet-processing microengines (MEs) 104. In other embodiments, each processing element cluster may include a different number of microengines, such as, but not limited to, four or eight microengines.

The embodiment of FIG. 1 shows various exemplary shared resource "targets" that are generally located around the periphery of network processor architecture 100. In turn, the shared resources are grouped at a first level to bus sets located toward the top and bottom of FIG. 1. The targets shown toward the top of FIG. 1, which are referred to as the "north" targets, include a traffic manager (TM) 108, a general-purpose processor (GP-Proc) 110, narrow random access memory (NRAM) control channels 112, 114, 116, and 118, a PCI (Peripheral Component Interconnect) interface 120, and a PCI Express interface 122. In general, an NRAM control channel is illustrative of a control channel that provides access control to various types of memory stores comprising narrow RAM devices, such as, but not limited to SRAM, Reduced Latency DRAM (RLDRAM), Quad Data-Rate (QDR) RAM, etc. The targets shown toward the bottom of FIG. 1, which are referred to as the "south" targets, include a first cryptographic (Crypto0) unit 124, a first media switch fabric (MSF0) interface 126, DRAM control channels 128 and 130, a hash unit 132, a DRAM control channel 134, a second media switch fabric (MSF1) interface 136, and a second cryptographic (Crypto1) unit 138.

Architecture 100 includes two sets of buses connecting the clusters $102_{1-4}$ to the various shared resource targets. In one embodiment, each set of buses includes a command bus and two sets of data buses—a push bus for read data, and a pull bus for write data. Thus, each cluster has two independent command buses and two sets of data buses. Additionally, in one embodiment the sets of buses further include associated tag buses (ID buses) for assisting transfer of data to/from the masters and targets.

The buses employed for the north targets located at the top of architecture 100 include a north command bus 140, a north pull data bus 142, a north pull ID bus 144, a north push data bus 146, and a north push ID bus 148. The buses employed for the south targets located at the bottom of architecture 100 include a south command bus 150, a south pull data bus 152, a south pull ID bus 154, a south push data bus 156, and a south push ID bus 158.

Figure 2A:
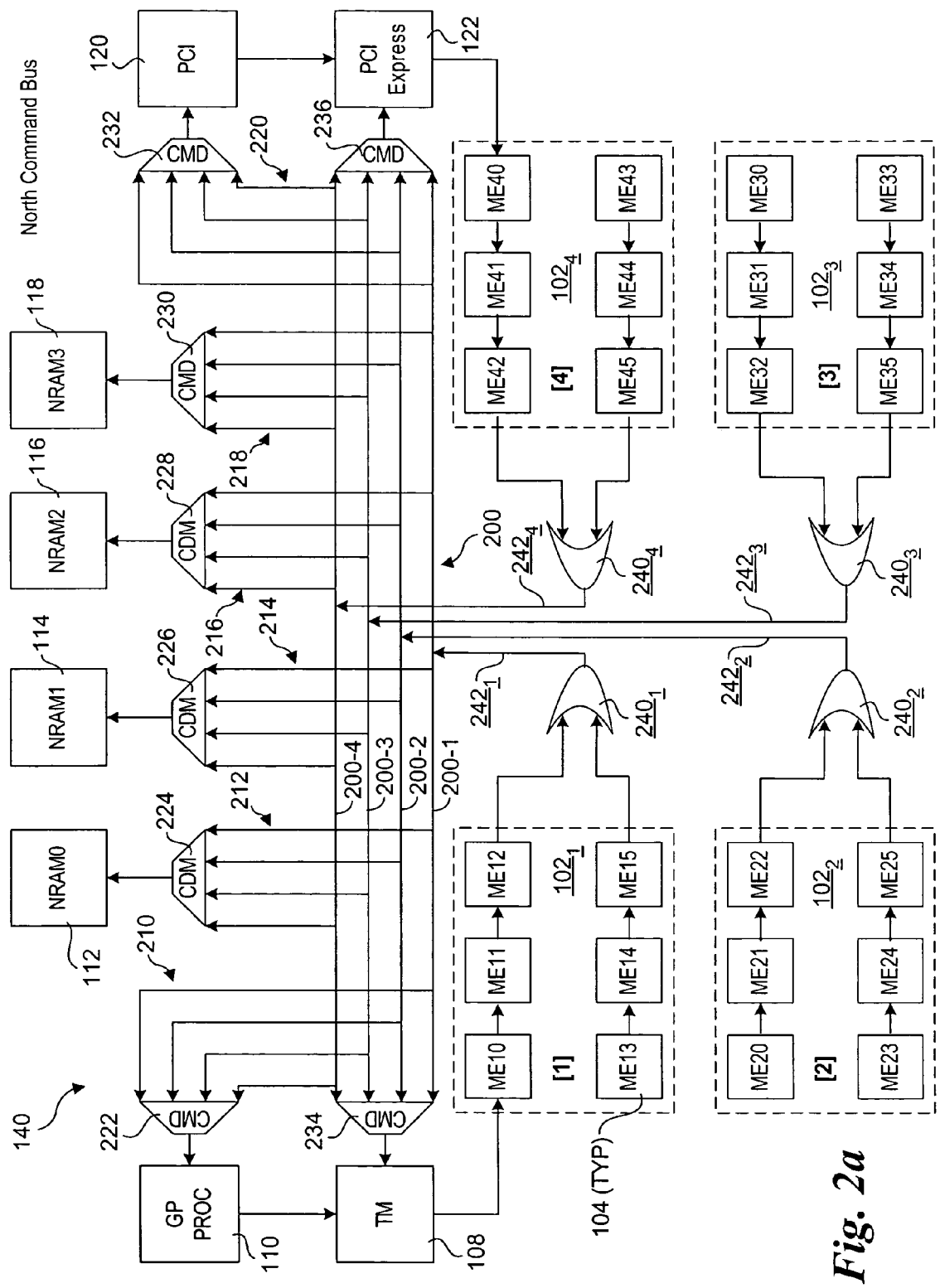
FIG. 2a is a schematic diagram illustrating details of a north command bus, according to one embodiment of the invention.

FIG. 2A shows details of north command bus 140, according to one embodiment. The north command bus employs a "cross-bar" configuration, where each target is connected to sets of bus lines via a respective multiplexer (also commonly referred to as a "mux"). This supports selective connections between each target and each cluster, which may be configured based on the routing provided by controlling the configuration of the various multiplexers.

The north command bus 140 circuitry includes a set of horizontal bus lines 200, including bus lines 200-1, 200-2, 200-3, and 200-4. It will be understood that each bus line represents a set of signal lines corresponding to a respective bus, rather than a single signal. The width of each bus is dependent on the particular requirements of the network processor implementation. Respective sets of cross-bar buses (depicted as bus lines) are coupled between horizontal bus line set 200 and a respective target via a respective command multiplexer. The cross-bar buses include cross-bar buses 210, 212, 214, 216, 218, and 220, while the multiplexers include command (CMD) multiplexer 222, 224, 226, 228, 230, and 232. Additionally, command multiplexers 234 and 236 are connected at opposite ends of horizontal bus line set 200.

In one embodiment, the number of buses (depicted as bus lines) in a bus line set is equal to the number of clusters in the architecture. For example, in the figures illustrated herein, the network processor architecture includes four clusters. Thus, the number of bus lines depicted for each bus line set is four, indicating there would be four sets of buses. In other embodiments (not shown), the network processor architecture may include other numbers of clusters, such as six, for example. In this case, each bus line set would include six bus lines depicting six sets of buses. In general, the number of bus lines (and thus buses) in a cross-bar bus architecture is equal to the number of bus lines in the horizontal bus to which each cross-bar bus is coupled.

The cross-bar bus architecture of north command bus 140 supports a two-stage arbitration scheme. The arbitration scheme is used to selectively connect a given master to a designated target to enable a command to be sent from the master to the target. The first stage is used to select a master from a given cluster, while the second stage is used to select the designated target from among all of the north targets. In general, the cluster arbitration process will be ongoing, wherein various masters in a cluster will be initiating new command requests in a continuous manner to the cluster arbiter. The outcome of the first arbitration stage, also referred to herein as cluster arbitration, for each of clusters $102_1$, $102_2$, $102_3$, and $102_4$ is depicted as respective outputs of OR gates $240_1$, $240_2$, $240_3$, and $240_4$. The OR gate representation is used to indicate that only one of the masters from a given cluster can initiate a target command at a time. Masters connected to each input of the OR gate are daisy chained The OR gate is used to reduce routing congestion and improve timing across the daisy chained command busses in each cluster. The north target command output stage of each cluster is connected to a corresponding bus line in bus line set 200 via a respective cross-bar bus. These include cross-bar buses $242_1$, $242_2$, $242_3$, and $242_4$.

Another concept illustrated in FIG. 2a is the ability for a selected shared resource to operate as both a target and as a master. For example, each of general-purpose processor 110, traffic manager 108, PCI interface 120, and PCI Express interface 122 may operate as both a target and a master. Additional daisy chained command busses are employed to route a target command request from one of general purpose processor 110 or traffic manager 108 via cluster $102_1$, and to route a target command request from one of PCI interface 120 or PCI Express interface 122 via cluster $102_2$, as illustrated in FIG. 2a.

Figure 2B:
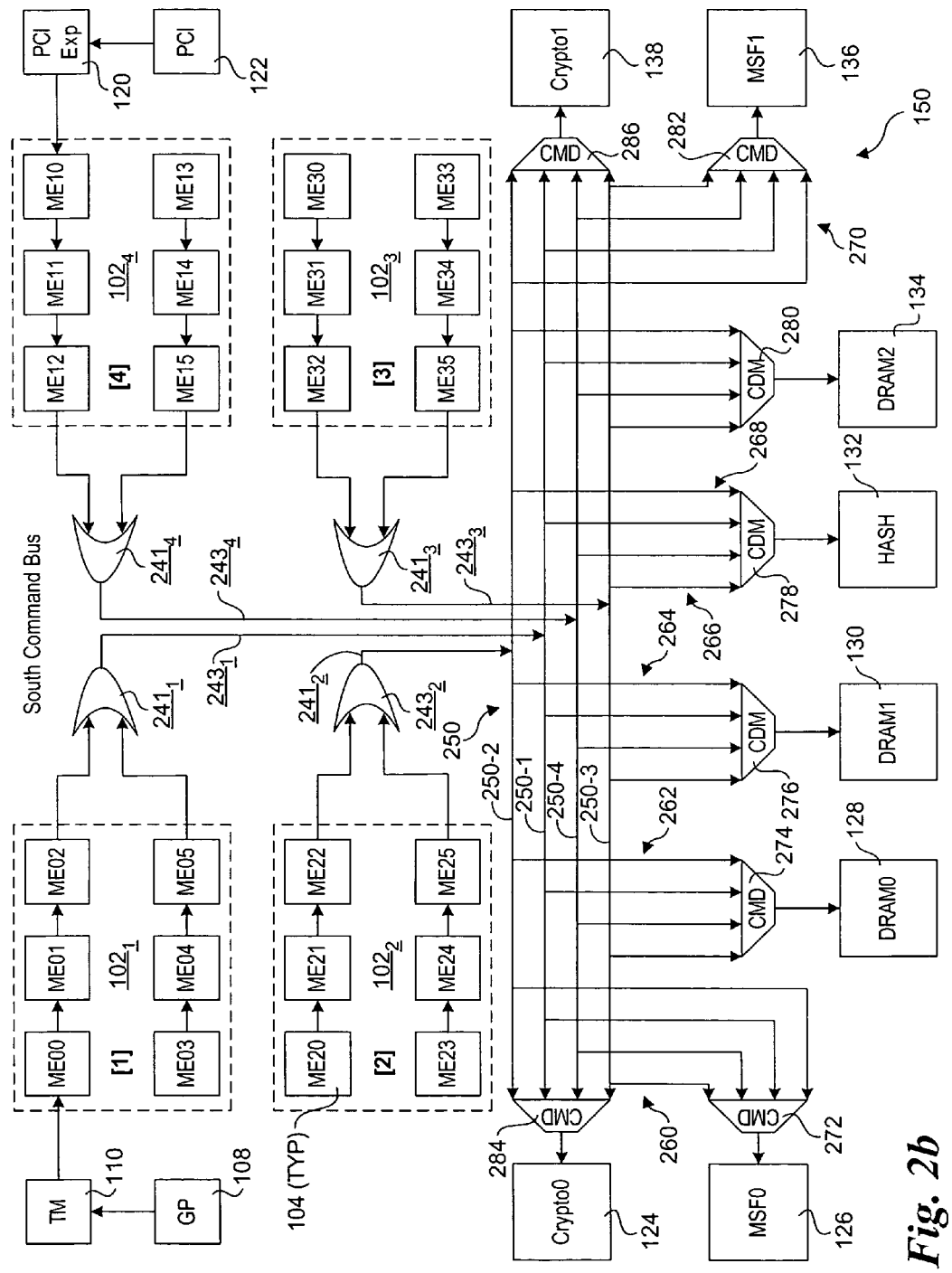
FIG. 2b is a schematic diagram illustrating details of a south command bus, according to one embodiment of the invention.

As illustrated in FIG. 2b, the bus architecture for south command bus 150, according to one embodiment, is analogous to the architecture for north command bus 140 shown in FIG. 2a. The bus architecture includes a horizontal bus line set 250 including bus lines 250-1, 250-2, 250-3, and 250-4. As with the north command bus architecture, respective cross-bar bus line sets are disposed between horizontal bus line set 150 and the various south targets via respective command multiplexers. These include cross-bar bus line sets 260, 262, 264, 266, 268, and 270, and command multiplexers 272, 274, 276, 278, 280, and 282. Additionally, command multiplexers 284 and 286 are connected at respective ends of bus line set 250 to couple the first and second cryptography units 124 and 138 to the bus line set.

As discussed above, the north and south command bus architectures enable any master to access any target, regardless of whether that target is a north target or a south target. Furthermore, this extends to masters that may also operate as targets, even if the master/target is not on the same north or south region as the target that is to be accessed via a corresponding command that is routed to that target via the combined north and south command bus architecture. For example, a component operating as both a north target and master may access a south target.

In one embodiment, respective cluster arbitration operations for commands issued by masters that are members of a given cluster (or by external master/target components that are associated with that cluster) are performed for each of the north and south target groups. The result of the intra-cluster arbitration for the south target commands is depicted by OR gates $241_1$, $241_2$, $241_3$, and $241_4$ in FIG. 2b. Meanwhile, the south target command output stage of each cluster is connected to a corresponding bus line in bus line set 250 via a respective cross-bar bus. These include cross-bar buses $243_1$, $243_2$, $243_3$, and $243_4$. Thus, in one embodiment, respective commands may be sent to designated targets from among the north and south target groups in a concurrent manner.

In the embodiments shown in FIGS. 2a and 2b, command requests (and subsequent granted commands) are forwarded between masters in a given cluster using a daisy chained scheme. This daisy chained design takes advantage of the multi-threaded approach used for performing packet-processing used by modern network processors. Thus, a target transaction request is passed from one master to the next master in the chain until it reaches the output stage for the cluster. Upon winning cluster arbitration at the output stage and target arbitration (i.e., arbitration between concurrent winning requests issued from multiple clusters to a common target), a target grant is provided to the master, and a command is placed on the horizontal bus line corresponding to the cluster.

Figure 3:
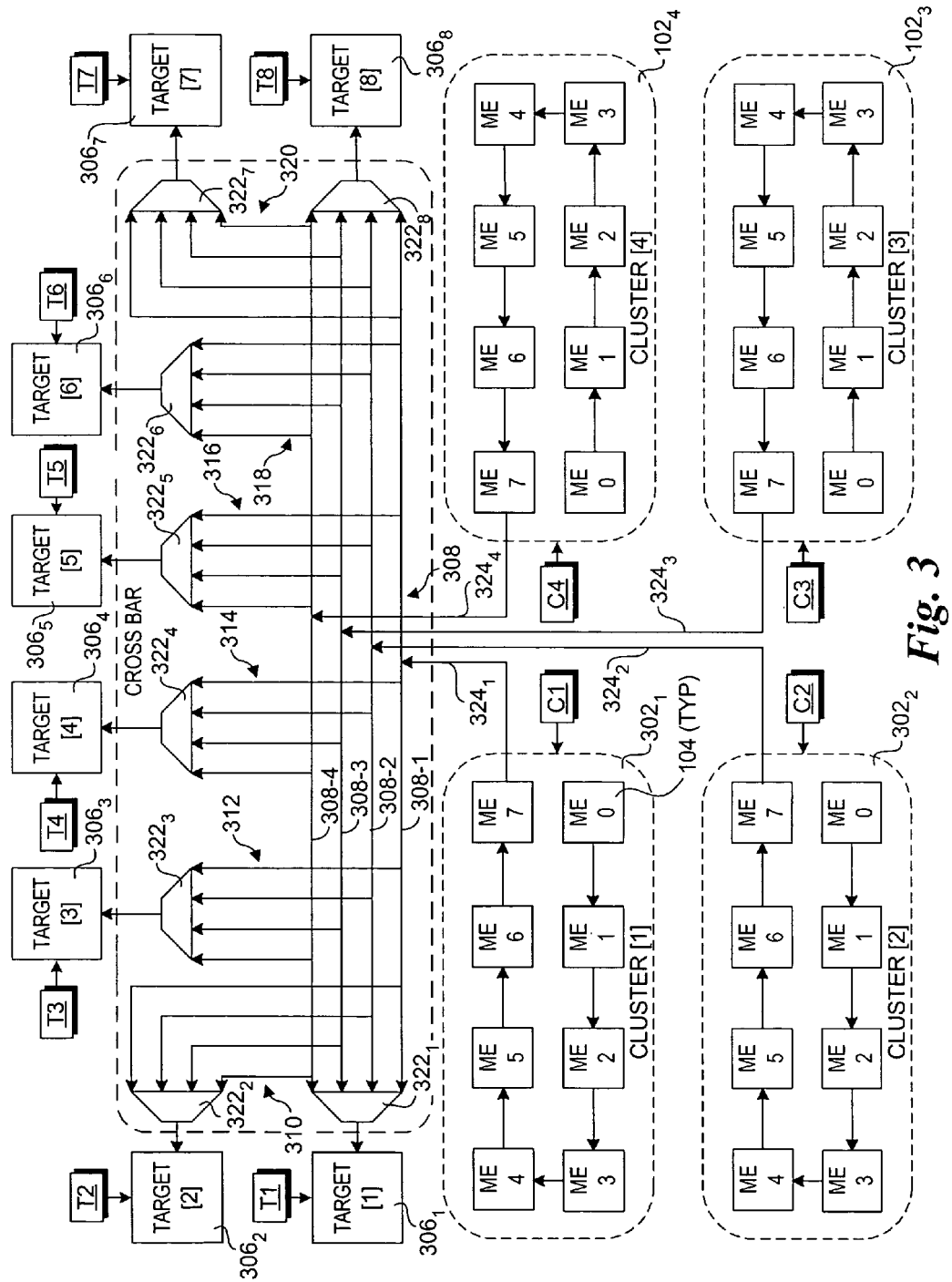
FIG. 3 is a schematic diagram of a generic cross-bar command bus interconnect including a plurality of first and second stage arbiters employed in two-stage command bus arbitration schemes, according to one embodiment of the invention.

Details of embodiments of two-stage arbitration schemes uses for arbitrating access grants to the various command bus lines of the chassis interconnect are shown in FIGS. 3, 4, 5a, and 5b. FIG. 3 depicts a generic cross-bar command bus architecture 300 that is roughly analogous to the north command bus architecture shown in FIG. 2a. The architecture includes four clusters $302_1$, $302_2$, $302_3$, and $302_4$, each including eight microengines 104. The clusters are coupled to eight targets via the cross-bar command bus infrastructure, including targets $306_1$, $306_2$, $306_3$, $306_4$, $306_5$, $306_6$, $306_7$, and $306_8$. For convenience, the targets are also labeled [1]–[8].

As before, the cross-bar command bus interconnect includes a horizontal set of bus lines 308, including bus lines 308-1, 308-2, 308-3, and 308-4. Respective sets of cross-bar buses (depicted as bus lines) are coupled between horizontal bus line set 300 and a respective target via a respective command multiplexer. The cross-bar buses include cross-bar buses 310, 312, 314, 316, 318, and 320, while the multiplexers include command multiplexers $322_2$, $322_3$, $322_4$, $322_5$, $322_6$, and $322_7$. Additionally, command multiplexers $322_1$, and $322_8$ are connected at opposite ends of horizontal bus line set 300. Each of clusters $302_1$, $302_2$, $302_3$, and $302_4$ is connected to a respective bus line 308-1, 308-2, 308-3, and 308-4 via a respective bus line $324_1$, $324_2$, $324_3$, and $324_4$.

As discussed above, a two-stage arbitration scheme is used for arbitrating access to the command bus. The first stage, cluster arbitration, is performed for arbitrating command requests from masters in a given cluster. Accordingly, a first-stage cluster arbiter is provided for each cluster, as depicted by cluster arbiters C1, C2, C3, and C4. The second stage, target arbitration, is performed for arbitrating requests from one or more cluster winners that are received at a common target. Thus, a respective target arbiter is provided for each target, as depicted by target arbiters T1, T2, T3, T4, T5, T6, T7, and T8.

Figure 4:
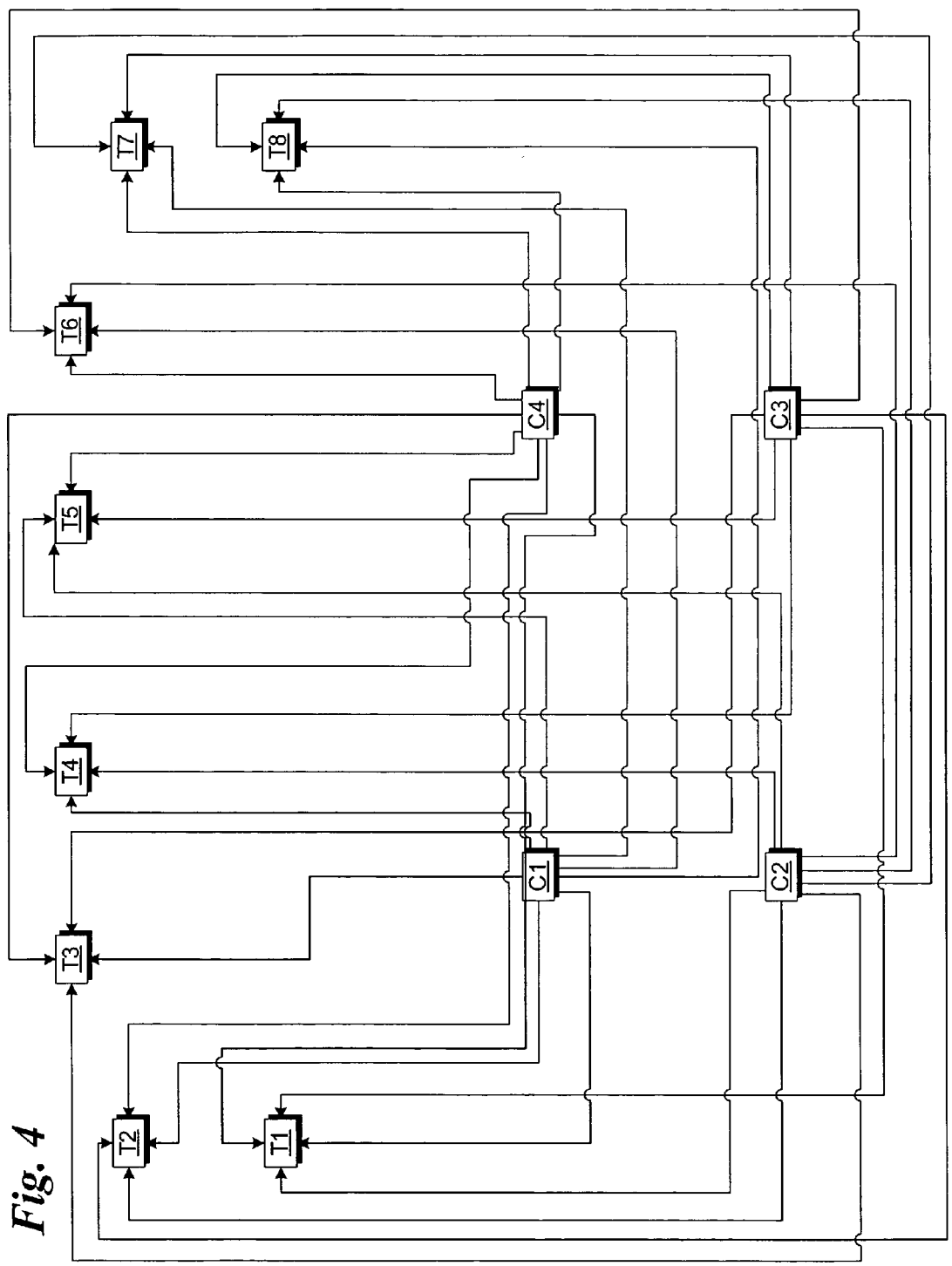
FIG. 4 is a schematic diagram illustrating a cross-connection scheme that is used to connect each first stage cluster arbiter to all of the stage-two target arbiters, according to one embodiment of the invention.

As shown in FIG. 4, each cluster arbiter C1, C2, C3, and C4 is coupled to all of the target arbiters T1, T2, T3, T4, T5, T6, T7, and T8 with respective bus lines, forming a cross-connected infrastructure. From the viewpoint of the targets, each target arbiter may receive access from cluster arbiters C1, C2, C3, and C4. From the viewpoint of the clusters, a cluster may submit a winning master's request to any of target arbiters T1, T2, T3, T4, T5, T6, T7, and T8 for second stage arbitration of the request.

Figure 5A:
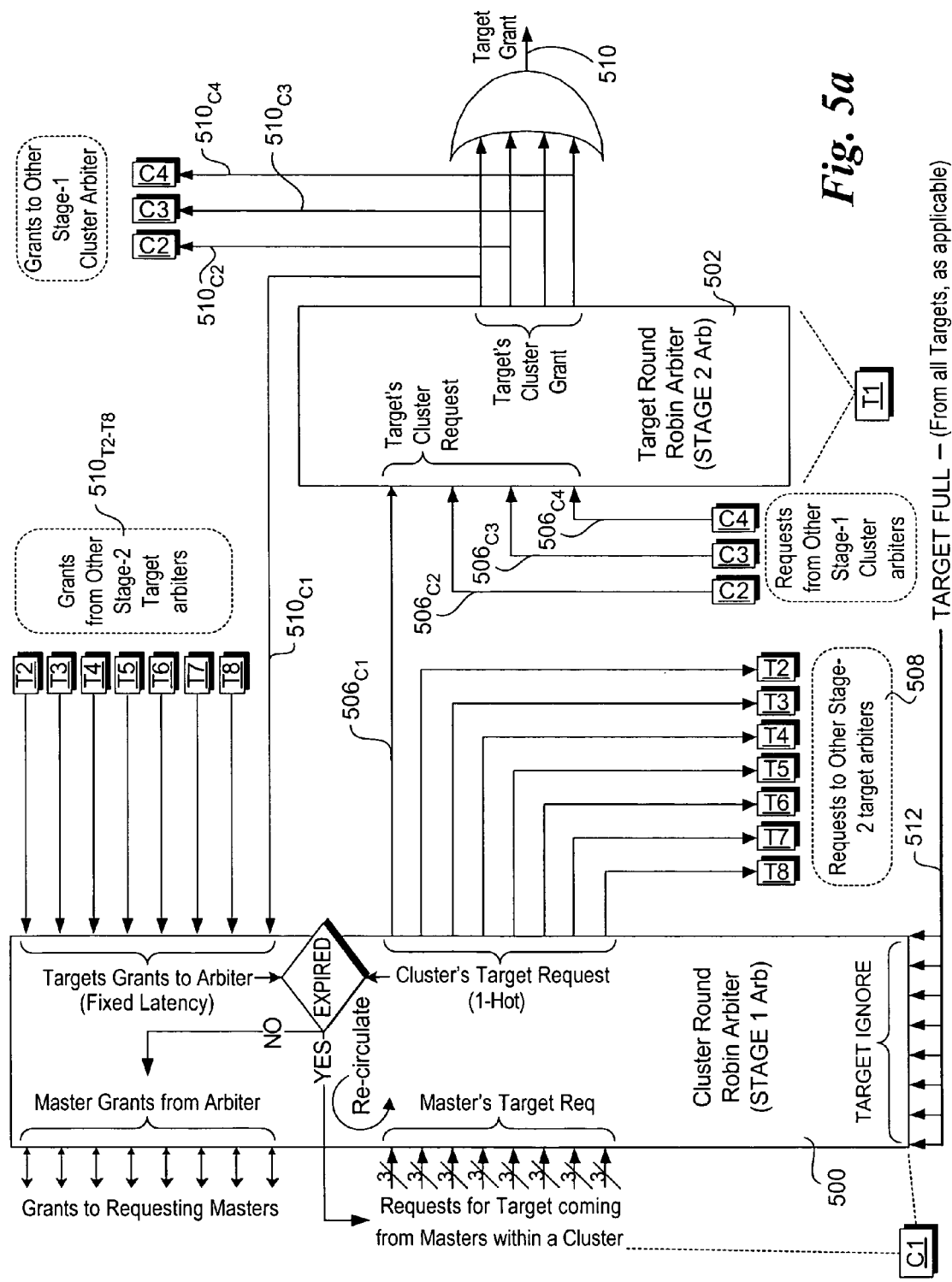
FIG. 5a is a schematic diagram illustrating details of a two-stage arbitration scheme employing re-circulation of second stage arbitration losers to be re-arbitrated via the first stage arbiter, according to one embodiment of the invention.

Details of a two-stage command bus arbiter, according to one embodiment, are shown in FIG. 5A. As discussed above, the two-stage arbiter for the system is implemented via sets of first and second stage cluster and target arbiters that are cross-connected. For simplicity, only one of each of the first and second stage arbiters is shown in FIG. 5a.

Under the embodiment of FIG. 5a, arbitration is performed by a stage-1 cluster arbiter 500 and a stage-2 target arbiter 502. (In connection with the embodiments of FIGS.

3 and 4, cluster arbiter 500 corresponds to cluster arbiter C1, while target arbiter 502 corresponds to target arbiter T1.) The cluster arbiter is used to arbitrate between competing target command requests issued by the various masters in a given cluster. These requests are depicted by masters' target requests 504. In the illustrated embodiment, the maximum number of targets is eight, so the number of bits required to unique specify a target is 4 bits (requests to target 0000 is the inactive request state from the masters), as shown. This scheme may be scaled to any number of targets by increasing the bit-width of each incoming target request. The stage-1 arbitration for each cluster is performed independent for the other clusters.

In one embodiment, cluster arbiter 500 employs a round-robin arbitration scheme. In general, a round robin arbiter selects a winning master using a repeated sequence. For example, a round-robin arbitration scheme for eight masters might be (in sequence) 1, 2, 3, 4, 5, 6, 7, 8, 1, 2, 3, 4, ... etc. Other sequences may also be used.

In one embodiment, the round robin arbitration includes a skid function, wherein the arbiter "skids" to the next requesting input corresponding to the round robin scheme. For example, suppose the round robin scheme arbitrates between transaction requests issued by eight masters. In the foregoing sequential round robin scheme, the round robin winner would be (in sequence) 1, 2, 3, 4, 5, 6, 7, 8, 1, 2, 3, 4, ... etc. But what happens if a next winner in the sequence does not have a pending request? For example, suppose the round robin sequence is about to select master 3, which does not have a pending request. The skid function skips the requester element without a pending requests and "skids" to the next element with a pending requests. In this example, suppose that requester 4 has the next pending request. The foregoing sequence would thus be 1, 2, 4, 5, 6, 7, 8, 1, 2, 3, 4, ... etc.

In general, target arbiter 502 performs the second-stage arbitration to resolve collisions that result from multiple clusters (stage-1 arbitration winners) requesting to access the same target. The target arbiter resolves such collisions by selecting one cluster winning request for the target using a second round-robin arbitration scheme. The cluster winning requests are depicted as stage-1 cluster winning requests $506_{C1-C4}$, which are produced by cluster arbiters C1–C4, respectively.

A given cluster arbiter may only issue a cluster winning command request to a particular target arbiter at any instance in time. However, first-stage arbitration winning requests may be concurrently provided to other second-stage arbiters, as depicted by winning requests 508.

Upon receiving a set of cluster winning requests (e.g., cluster winning requests $506_{C1-C4}$), second-stage arbitration is performed on the cluster winning requests by a target arbiter 502 to produce a target winning request. In one embodiment, target arbiter 502 employs a round-robin arbitration scheme similar to that discussed above. In another embodiment, the second-stage round-robin arbitration scheme employs a skid function, as described above.

The result of the second arbitration stage is a target grant 510 that is returned to the cluster that submitted the winning request. Such target winning grants are depicted as target grants $510_{C1-C4}$. It is noted that a given target arbiter may only issue one target grant at a time. However, due to the cycle latencies produced by the ongoing pipelined processing approach used in one embodiment, multiple staggered target grants may be pending at the same time.

Over various cycles, cluster arbiter 500 receives target grants from the various target arbiters 502, as depicted by target grant $510_{C1-C4}$ and $510_{T2-T8}$. In one embodiment, the target grant is passed through the cluster arbiter to the master from which the winning command request originated. In response, the command bus is arbitrated (configured) to momentarily connect the master and target corresponding to the granted command request to one another to enable a command to be passed from the master to the target.

In another embodiment, a re-circulation of second-stage losers is performed, such that a second-stage losing request is re-arbitrated with the first stage arbiter. In case of a collision in the second stage arbiter, the losing requests must still be serviced. Under a conventional approach, requests that lose the final arbitration at the output of stage 2 are simply requeued. However, under the recirculation technique, the losing requests are re-circulated back as inputs to the stage-1 arbiter, and are thus re-arbitrated during the next arbitration cycle.

In one embodiment, a determination of whether to re-circulate a winning stage-1 request is performed by observing whether the round-trip arbitration latency (e.g., the amount of time between when a cluster winning request is submitted for second-stage arbitration and the amount of time a corresponding target grant is (or is not) received) exceeds a pre-determined expiration value. Under a pipelined processing approach, arbitration processing is performed via a sequence of operations, with the sequence advancing with each clock cycle. As a result, the round trip arbitration latency is fixed, such that the number of cycles between when a cluster winning request submitted for second-stage arbitration and the time at which a corresponding grant is received by the submitting first stage arbiter is a known constant. Accordingly, if a target grant, issued in response to a corresponding first-stage cluster winning request, is not received by the cluster arbiter prior to the predetermined round-trip arbitration latency, the first stage winning request was a second stage loser. As a result, this request is returned as an input request to the first stage arbiter, as if it was a new request. It is noted that the number of requests submitted to the first-stage arbiter is still equal to the number of masters associated with the cluster. As a result, a given master will not issue a new request until a previous request has been granted.

The re-circulation scheme provides several advantages. It avoids head of line blocking of clusters by losing microengines at stage 1. It also avoids choking of a cluster by a full target requested by a losing microengine. For example, the target requested by a queued request can become full before the losing request is serviced. In this case, a queued losing request will block the entire cluster until the target is available. Based on the loser request re-circulation scheme, requests from the losing cluster to other targets may be serviced while the requested target is full.

This relates to another aspect of the arbitration scheme of FIG. 5a. If a target is full, there is no point in submitting a request to access the target, as the target cannot be serviced when full. Accordingly, in one embodiment, each target is enabled to provide an input to each cluster arbiter 500 indicating whether or not the target is full, as depicted by a target full signal 512. This is provided as an input to the round-robin arbitration scheme. As a result, a round-robin arbitration result that would normally produce a cluster winning request corresponding to request from a given master to access a full target is ignored, and proceeds to the next master in the round-robin sequence in a manner akin to the skid function described above.

Although the foregoing re-arbitration scheme provides several advantages, it does not guarantee a maximum arbitration latency. The two-stage arbiter generally requires 2–3 chassis clock cycles for each arbitration decision. Since the arbiter design supports pipelining, and the chassis operates at a high frequency, the arbitration latency becomes inconsequential for a network processor's overall throughput. However, a multi-cycle two-stage arbitration scheme introduces unfairness to the masters. Since the two stages of arbitration decisions are offset in time, not every winning stage-1 request is honored by a stage-2 arbiter. Losers returning from a stage-2 arbiter are re-arbitrated in stage 1. If re-arbitrated losers again lose in a stage-2 arbiter several times, the overall command latency may become unacceptably high.

To address this situation, a two-stage arbiter embodiment is provided that employs a re-prioritization of stage-2 losing requests. An exemplary implementation of the re-prioritization scheme is illustrated by the embodiment of FIG. 5b. This embodiment operates in a similar manner to the embodiment of FIG. 5a, with the addition of re-prioritization of the stage-2 losers, as depicted by the like-numbered components in both figures.

The core concept behind reprioritization of losing requests is to ensure a bounded latency for masters requesting access to a target. In the stage-1 arbiter, the reprioritization scheme elevates the priority of a re-circulated loser from stage 2 and re-arbitrates it in the very next cycle. The process is repeated, if required, until the loser finally receives a grant from stage 2. Since the arbitration latency is multi-cycle, other requests from the cluster are pipelined behind the re-arbitrated loser based on the regular round-robin arbitration scheme. Hence, the cluster is not blocked by a returning losing request. Furthermore, the scheme is scalable to any number of masters and any number of targets.

As shown in the FIG. 5b embodiment, one technique via which the scheme may be implemented employs high priority tags that are issued in conjunction with cluster winning requests to the various targets in the system. An exemplary set of high priority tags $514_{C1}$, $514_{C2}$, $514_{C3}$, and $514_{C4}$ issued from respective cluster arbiters C1, C2, C3, and C4 are shown in FIG. 5b.

The Cluster arbiter sends first time requests to the Stage-2 arbiter with a priority level of "0". Each time this request loses the Stage-2 Arbitration, the priority level is incremented. The request with the highest priority level are sent to the Stage-2 arbiter in the very next cycle.

The number of priority levels required for each high priority tag (and thus the number of tag bits) will depend on the number of clusters issuing the tags. In the exemplary configuration including four clusters depicted in the figures herein, four levels (represented by two bits) are required.

In the stage-2 arbiter, requests at the highest priority level are serviced first. Multiple priority requests of the same level are serviced on a round-robin basis. If no priority requests are received by a stage-2 arbiter, it arbitrates all requesters on a round-robin basis in the manner discussed above for FIG. 5a.

Based on this reprioritization scheme, the maximum number of times a Stage-1 request can lose is equal to the total number of clusters in the system. Thus, the theoretical max latency ($L_{max}$) of any master's command request is $L_{max} = M * n * C$ clock cycles where
   M is number of masters per cluster,
   n is the arbitration latency of the 2-stage arbiter
   C is the number of clusters The above equation assumes that every master in the cluster had to be raised to the highest priority level to get serviced by the Stage-2 arbiters.

For a Chassis arrangement shown in FIG. 3, (assuming a 2 cycle arbitration latency of the arbiter), $L_{max}=8*2*4=64$ cycles. Based on initial modeling, the average latency in this scheme is expected to be approximately 4.4 cycles. This is a vast improvement from the potentially unbounded maximum latency corner cases without the reprioritization scheme.

The re-prioritization scheme provides several advantages. Almost all losers from stage-2 arbiters are granted on the second attempt due to the high priority tag associated with re-arbitrated requests. This significantly reduces the maximum and average latency of the commands. The scheme avoids head of line blocking of clusters by not blocking all command requests from a cluster until a loser is serviced. Furthermore, the scheme provides a generic basis for scaling performance in future network processors, while keeping system latency bounded.

Figure 6:
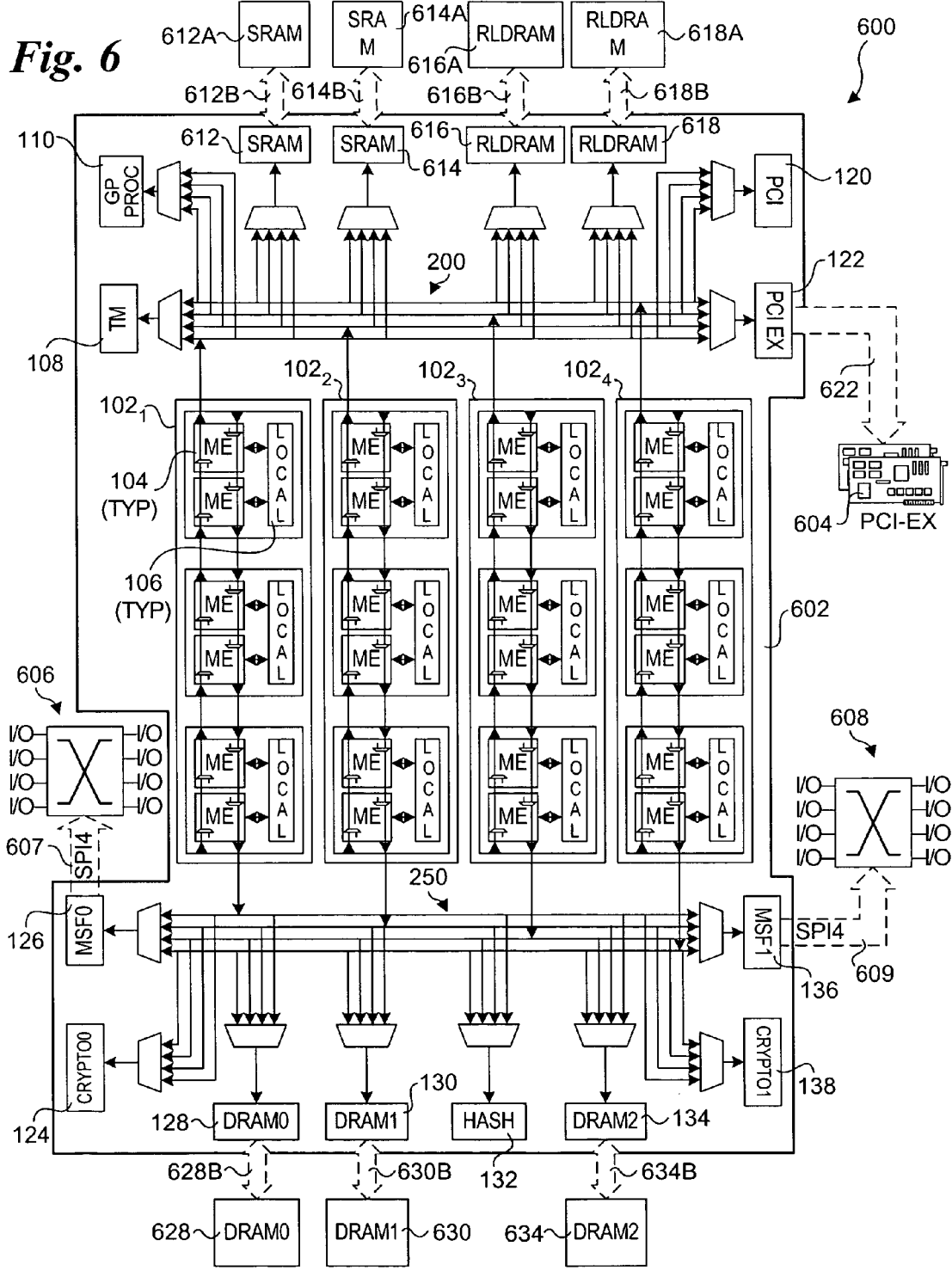
FIG. 6 is a schematic diagram of a network device including a network processor implementing the architecture of FIG. 1 and the two-stage arbitration schemes of FIGS. 5a and 5b, according to one embodiment of the invention.

Network processors that implement architecture 100 of FIG. 1, and include support for the two-stage arbitration operations discussed above may be implemented in various network devices, such as, but not limited to, switches, line cards, routers, etc. FIG. 6 shows an exemplary architecture of a network device 600 including a network processor 802 that implements network processor architecture 100 and employs an embodiment of the two-stage command arbitration schemes discussed above. In general, like-numbered components in FIGS. 1 and 6 perform similar functions. (For the purpose of clarity, details of the cluster and target arbiters are not shown in FIG. 6, although it will be understood that such components would exits in an actual implementation.) In addition to these like numbered components, network processor 602 includes SRAM control channels 612 and 614, RLDRAM control channels 616 and 618.

In the illustrated embodiment of FIG. 6, microengines 104 are grouped into sets of two microengines that share a common set of local resources 106. Local resources may typically include resources that are specific to a microengine (or pair of microengines in this case), such as a local memory, instruction cache, registers, etc. In other embodiments, microengines may be configured to share local resources in groups having more than two members, or they may be configured to have the own set of local resources on an individual basis.

As discussed above, the crossbar chassis configuration of network processor architecture 100 enables various masters (e.g., microengines 104) to access various targets via corresponding transactions requests. In some embodiments, some of the actual data or operations supported by the "effective" targets are provided on the network processor chip, while others are provided off-chip. For example, while an NRAM control channel may comprise a target (for the purpose of the foregoing discussion), the effective target is the actual NRAM store that is accessed via the NRAM control channel (since the control channel does not store any data by itself).

In the exemplary configuration shown in FIG. 6, the on-chip "effective" targets include traffic manager 108, general-purpose processor 110, cryptographic units 124 and 138, hash unit 132, and public key encryption unit 133. Meanwhile, various off-chip effective targets include external SRAM stores 612A and 614a, external RLDRAM stores 616A and 618A, one or more PCI Express devices (e.g., expansion cards) 604, and external DRAM stores 628, 630, and 634. Each off-chip memory store is connected to its respective control channel by a respective interface. These include SRAM interfaces 612B and 614B, RLDRAM interfaces 616B and 618B, DRAM interfaces 628B, 630B, and 634B, and PCI Express interface 622.

Network devices are used to perform packet-processing operations. One of the primary functions performed during packet processing is determining the next hop to which the packet is to be forwarded. A typical network device, such as a switch, includes multiple input and output ports. More accurately, the switch includes multiple input/output (I/O) ports, each of which may function as either an input or an output port within the context of forwarding a given packet. An incoming packet is received at a given I/O port (that functions as in input port), the packet is processed, and the packet is forwarded to its next hop via an appropriate I/O port (that functions as an output port). The switch includes a plurality of cross-connects known as the media switch fabric. The switch fabric connects each I/O port to the other I/O ports. Thus, a switch is enabled to route a packet received at a given I/O port to any of the next hops coupled to the other I/O ports for the switch.

The exemplary network device of FIG. 6 includes two sets of media switch fabrics 606 and 608. In one embodiment, media switch fabric 606 is connected to first media switch fabric interface 126 via a System Packet Interface Level 4 (SPI4) interface 607, while media switch fabric 608 is connected to second media switch fabric interface 140 via an SPI4 interface 609.

In general, aspects of the foregoing embodiments may be implemented using programmed logic using known semiconductor fabrication techniques. In addition, embodiments of the present description may be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
   a plurality of masters, configured in a plurality of clusters;
   a plurality of targets, each target comprising a sharable resource that is accessible to the plurality of masters;
   a bus interconnect, comprising a plurality of sets of bus lines connected between the plurality of clusters and the plurality of targets; and
   a two-stage arbiter, operatively coupled to the targets and clusters, to arbitrate access to the bus interconnect to facilitate transfer of requests issued from the plurality of masters to the plurality of targets via the bus interconnect, wherein the two-stage arbiter includes a plurality of cluster arbiters connected to a plurality of target arbiters.

2. The apparatus of claim 1, wherein the two-stage arbiter includes:
   a first stage comprising a cluster arbiter that arbitrates command requests issued by the masters in a cluster to output a cluster winning command request; and
   a second stage comprising a target arbiter that arbitrates cluster winning command requests passed to the target arbiter from one or more cluster arbiters to produce a target grant.

3. The apparatus of claim 2, wherein the two-stage arbiter includes a mechanism to re-circulate second stage losing cluster winning command requests back to the first stage cluster arbiter for re-arbitration by the cluster arbiter.

4. The apparatus of claim 3, wherein the two-stage arbiter employs pipelined processing, and the mechanism to re-circulate second stage losing command requests comprises a latency check that determines whether a cluster winning command request was granted by a second stage target arbiter by checking to see if a corresponding target grant is received by a first stage cluster arbiter from which the command request originated within a pre-determined number of process cycles.

5. The apparatus of claim 3, wherein the two-stage arbiter further includes a prioritization mechanism that is used to re-prioritize re-circulated second stage losing command requests to have a higher priority than competing command requests received by a second stage arbiter that have not been re-prioritized.

6. The apparatus of claim 5, wherein the prioritization mechanism includes at least one high priority tag line coupled between a first stage cluster arbiter and a second stage target arbiter.

7. The apparatus of claim 3, wherein each cluster arbiter is cross-connected to all of the target arbiters.

8. The apparatus of claim 1, wherein the plurality of masters include a plurality of processing elements.

9. The apparatus of claim 1, wherein the apparatus comprises a network processor, and the plurality of masters includes a plurality of packet-processing elements.

10. The apparatus of claim 1, wherein each of a first and second stage in the two-stage arbiter includes a round-robin arbiter.

11. The apparatus of claim 10, wherein at least one of the round-robin arbiters includes a skid function.

12. The apparatus of claim 1, further comprising additional command bus circuitry to enable a shared resource coupled to the bus interconnect to selectively operate as both a target and a master.

13. The apparatus of claim 12, further comprising a general-purpose processor that may be selectively operated as both a target and a master.

14. The apparatus of claim 1, further including a mechanism to prevent a command request destined for a target that is full from winning a first stage arbitration.

15. The apparatus of claim 1, wherein a first portion of the targets are associated with a first plurality of sets of bus lines having a cross-bar configuration and corresponding to a first instance of the bus interconnect, and wherein a second portion of the targets are associated with a second plurality of sets of bus lines having a cross-bar configuration and corresponding to a second instance of the bus interconnect.

16. The apparatus of claim 1, wherein the apparatus comprises an integrated circuit (IC) chip, and wherein the plurality of clusters are disposed towards a center portion of the IC chip while the plurality of targets are disposed peripherally about the center portion of the IC chip.

17. The apparatus of claim 1, wherein the sets of bus lines form cross-bar interconnects including a plurality of target multiplexers coupled to respective targets, and wherein the two-stage arbiter is further operatively coupled to the target multiplexers.

18. A method comprising:
performing a first stage arbitration of a plurality of command requests issued by a plurality of masters in a cluster, each command request corresponding to a command a master wishes to send to one of a plurality of targets, each target comprising a shared resource that is operatively coupled to cluster via a command bus interconnect, the first stage arbitration being performed by a first stage arbiter that produces a cluster winning command request;
concurrently performing the foregoing first stage arbitration operation for command requests issued by masters in a plurality of respective clusters to produce a plurality of cluster winning command requests produced by respective first stage arbiters;
performing a second stage arbitration of the plurality of cluster winning command requests via a second stage arbiter to produce a target command request winner, wherein the first and second stage arbitrations are executed by a two-stage arbiter including a plurality of cluster arbiters connected to a plurality of target arbiters;
generating a target grant identifying a winning command request and passing the target grant back to the master from which the corresponding command request originated; and
arbitrating the command bus interconnect to transfer a command from the master from which the command request originated to the target identified in the command request.

19. The method of claim 18, further comprising:
determining whether a first stage arbitration winning command request results in a target grant in response to the second stage arbitration, a command request not receiving a target grant comprising a second stage arbitration loser; and
re-circulating the second stage arbitration loser to be re-arbitrated during a subsequent first stage arbitration.

20. The method of claim 19, wherein determining whether the first stage arbitration winning command request is a second stage arbitration loser comprises:

determining a round-trip arbitration latency corresponding to a first stage arbitration winning request receiving a target grant that is returned to the first stage arbiter; and
determining whether an arbitration latency for a given first stage arbitration winning command request exceeds the round-trip arbitration latency, wherein if the round-trip arbitration latency is exceed a target grant was not provided by a second stage arbiter for the given first stage arbitration winning command request.

21. The method of claim 18, further comprising:
determining whether a first stage arbitration winning command request results in a target grant in response to the second stage arbitration, a command request not receiving a target grant comprising a second stage arbitration loser;
re-prioritizing the second stage arbitration loser; and
submitting the re-prioritized second stage arbitration loser for re-arbitration by the second stage arbiter.

22. The method of claim 21, further comprising:
identifying a first stage arbitration winning command request has been re-prioritized by providing a high prioritization tag along with a first stage arbitration winning command request to a second stage arbiter.

23. The method of claim 18, further comprising:
preventing a command request destined for a target that is full from winning a first stage arbitration.

24. The method of claim 23, further comprising:
providing a signal to a first stage arbiter indicating a target is full.

25. The method of claim 18, further comprising:
employing a round-robin arbitration scheme to determine an arbitration winner for at least one of the first and second stage arbiters.

26. The method of claim 25, further comprising:
employing a round-robin arbitration with a skid function for at least one of the first and second stage arbiters.

27. A network device, comprising:
a network processor including,
    a plurality of microengines, configured in a plurality of clusters;
    a plurality of targets, each target comprising a sharable resource that is accessible to the plurality of microengines, the targets including a media switch fabric interface and a Peripheral Component Interconnect (PCI) Express interface;
    a chassis command bus interconnect, comprising a plurality of sets of bus lines connected between the plurality of clusters and the plurality of targets, the sets of bus lines forming a cross-bar interconnects including a plurality of target multiplexers coupled to respective targets; and
    a two-stage arbiter, operatively coupled to the targets, target multiplexers, and clusters, to arbitrate access to the command bus to facilitate transfer of command requests issued from the plurality of masters to the plurality of targets via the chassis command bus interconnect, wherein the two-stage arbiter includes a plurality of cluster arbiters connected to a plurality of target arbiters;
a media switch fabric, including cross-over connections between a plurality of input/output (I/O) ports via which packets are received at and forwarded from, coupled to the media switch fabric interface; and
a PCI Express card, coupled to the PCI Express interface.

28. The network apparatus of claim 27, further comprising:
   a dynamic random access memory (DRAM) control channel, comprising a target; and
   a DRAM store, coupled to the DRAM control channel.

29. The network apparatus of claim 27, further comprising:
   a second media switch fabric interface, comprising a target; and
   a second media switch fabric, coupled to the second media switch fabric interface.

30. The network apparatus of claim 27, wherein the two-stage arbiter comprises:
   a first stage comprising a cluster arbiter that arbitrates command requests issued by the masters in a cluster to output a cluster winning command request; and
   a second stage comprising a target arbiter that arbitrates cluster winning command requests passed to the target arbiter from one or more cluster arbiters to produce a target grant.

* * * * *